May 23, 1961 J. B. WIENER ET AL 2,985,299

CARD PROCESSING APPARATUS

Filed Oct. 8, 1956 3 Sheets-Sheet 1

INVENTORS:
Jerome B. Wiener
Loren R. Wilson

By Smyth & Roston

Attorneys

May 23, 1961 J. B. WIENER ET AL 2,985,299

CARD PROCESSING APPARATUS

Filed Oct. 8, 1956 3 Sheets-Sheet 2

INVENTORS.
Jerome B. Wiener
Loren R. Wilson

By Smyth & Roston
Attorneys

May 23, 1961 J. B. WIENER ET AL 2,985,299

CARD PROCESSING APPARATUS

Filed Oct. 8, 1956 3 Sheets-Sheet 3

PRIOR ART

INVENTOR:
Jerome B. Wiener
Loren R. Wilson

By Smyth + Roston
Attorneys

United States Patent Office 2,985,299

Patented May 23, 1961

2,985,299

CARD PROCESSING APPARATUS

Jerome B. Wiener, Granada Hills, and Loren R. Wilson, Pacific Palisades, Calif., assignors to Magnavox Company, Los Angeles, Calif., a corporation of Delaware Filed Oct. 8, 1956, Ser. No. 614,686

20 Claims. (Cl. 209—72)

The present invention relates to apparatus for controlling the path of information cards as they are circulated on vacuum pressure transporting drums or on other appropriate transporting means. The invention is more particularly concerned with an improved gate structure and apparatus for controllably transferring such information cards from one transporting medium to another.

Data processing systems have come into widespread use in recent years. In one system of this general type, the data is stored in a multiplicity of individual cards. Each card contains a plurality of bits of information which is represented, for example, by the presence or absence of holes or by magnetic dots of a first or second polarity.

Systems using rotatable transporting drums have been proposed for selecting, sorting and collating the information cards, for transporting these cards to one or more processing stations, and for otherwise controlling the cards. Such drums are equipped with peripheral slots and air is drawn through the hollow interior of the drums and through these slots to create a vacuum pressure at the peripheral edges of the drums. This vacuum pressure enables the cards to be firmly retained on the peripheral edges of the drums for circulation from one station to another.

It is often desirable in systems of the type described in the preceding paragraph to utilize a plurality of transporting drums and to transfer the information cards from one drum to another. For example, when it is desired to select a card bearing certain desired information from a stack of information cards, all the cards may be fed to a first drum and transported on that drum past a transducer head. This transducer head may then read the information on the successive cards until the desired card is reached. After each card other than the desired card is read by the transducer head, it may be circulated on the first drum to an output stack, and when the desired card is read, it may be automatically transferred to a second drum for further processing. Automatically controlled gate mechanisms are known for effecting such a transfer of the desired card from one drum to another. An object of the present invention is to provide an improved gate mechanism and structure for this purpose.

Many other systems are known in which the information cards, for one reason or another, are circulated on each of a plurality of rotatable vacuum pressure transporting drums and are transferred from one of these drums to another. One system controls such a transfer by means of mechanically pivotable gates. This system is described and claimed in copending application 566,404, filed February 20, 1956, in the name of Jerome B. Wiener and assigned to the assignee of the present application. This co-pending application has been assigned of record to the same assignee as this application.

The gate mechanism described in the copending Wiener application is disposed between two adjacent drums which are rotating in opposite directions. For example, one of the drums may be rotating in a clockwise direction and the other drum may be rotating in a counterclockwise direction when viewed from the same position. The gate is controllable to be pivoted into three different positions, and such control may conveniently be made by a pair of electromagnets and opposing coil springs. The gate has a neutral position in which it is disposed intermediate the two adjacent drums and is not effective to produce a transfer of cards from one drum to the other. When one of the electromagnets is energized, the gate is pivoted so that it engages the periphery of one of the drums to strip a card from that drum and cause it to be transferred to the other drum. When the other electromagnet is energized, the reverse occurs and the gate is pivoted so that it engages the periphery of the other drum to strip a card from the latter drum and transfer it to the former.

The same result has been accomplished by controllably directing air jets between the two drums and toward their respective peripheral surfaces. These jets are appropriately directed so that they may lift a card from one drum and cause it to be transferred to the other. Such an arrangement is disclosed and claimed in copending application Serial No. 562,154 filed in the name of Stuart L. Peck et al., on January 30, 1956, and assigned to the present assignee. This co-pending application has been assigned of record to the same assignee as this application.

Both the mechanical and pneumatic types of transfer gate mechanisms such as those referred to above have been used successfully. However, these types of gate mechanisms require a rotation in opposite directions of the two drums between which the transfer is to be made. By "opposite" rotation is meant a movement of one drum in a clockwise direction and a movement of the other drum in a counterclockwise rotation. Also, when a card is transferred from one drum to the other by these mechanisms, the contacting face of the card is reversed during the transfer so that it engages the second drum on a face opposite to that with which it engaged the first drum.

In a manner to be described, the requirement for the drums to be rotating in opposite directions and the requirement for the reversal of the transferred cards may under some circumstances unnecessarily complicate the data processing system. Also, it is sometimes desirable, especially when the information is stored on the cards by magnetic or photographic means, that one face only of each card be used for the magnetic data and that the other face only of the card bears against the transporting drum. This is to obviate wear of the magnetic or photographic material on the face of the card. Such wear might result if that face engaged the transporting drum. This is especially true when a card is fixedly disposed within a stack and part of the card is positioned against a drum for subsequent removal by the drum from the stack. At such times, the magnetic material may tend to become removed since the drum rubs against the card as it rotates.

In brief, therefore, although the transfer gates disclosed in the copending applications are well suited for their intended purpose and efficiently perform their intended function, it is desirable under some circumstances and in some environments that the rotatable transporting drums rotate in one direction only and that the information cards contact the drums on only one of their surfaces. The present invention provides an improved gate mechanism which fulfills these criteria and which is eminently suited for use in the latter type of system.

In one embodiment of the invention, a pair of spaced parallel guide rails of generally arcuate configuration are disposed to extend between the drums. Suitable means are used to direct streams of air under pressure against the cards on the periphery of one of the drums. These streams of air overcome the vacuum retaining effect of the first drum on the cards and cause the cards to be successively lifted from the first drum and transferred to the guides. Subsequent rotation of the first drum causes each of the lifted cards to be moved along the guides until it comes under the influence of the vacuum pressure of the second drum. The second drum then draws the card onto its peripheral surface. The mechanism is so constructed that in the absence of streams of air the cards circulate on the first drum under and past the transfer mechanism of the invention and remain on that drum. Therefore, by turning the air streams on and off, a selective control of the transfer of the cards from the first drum to the second can be obtained.

It will be seen that the cards transferred by the mechanism of the invention are not reversed. Because of this, each card engages the second transporting drum on the same surface with which it engaged the first drum. It will also be seen that both the first and second drums rotate in the same direction. For example, both drums rotate in a clockwise direction or in a counterclockwise direction when viewed from the same position. As described above, these features permit a simplification of the transporting mechanism and of the data processing system in general.

Figures 1, 4:
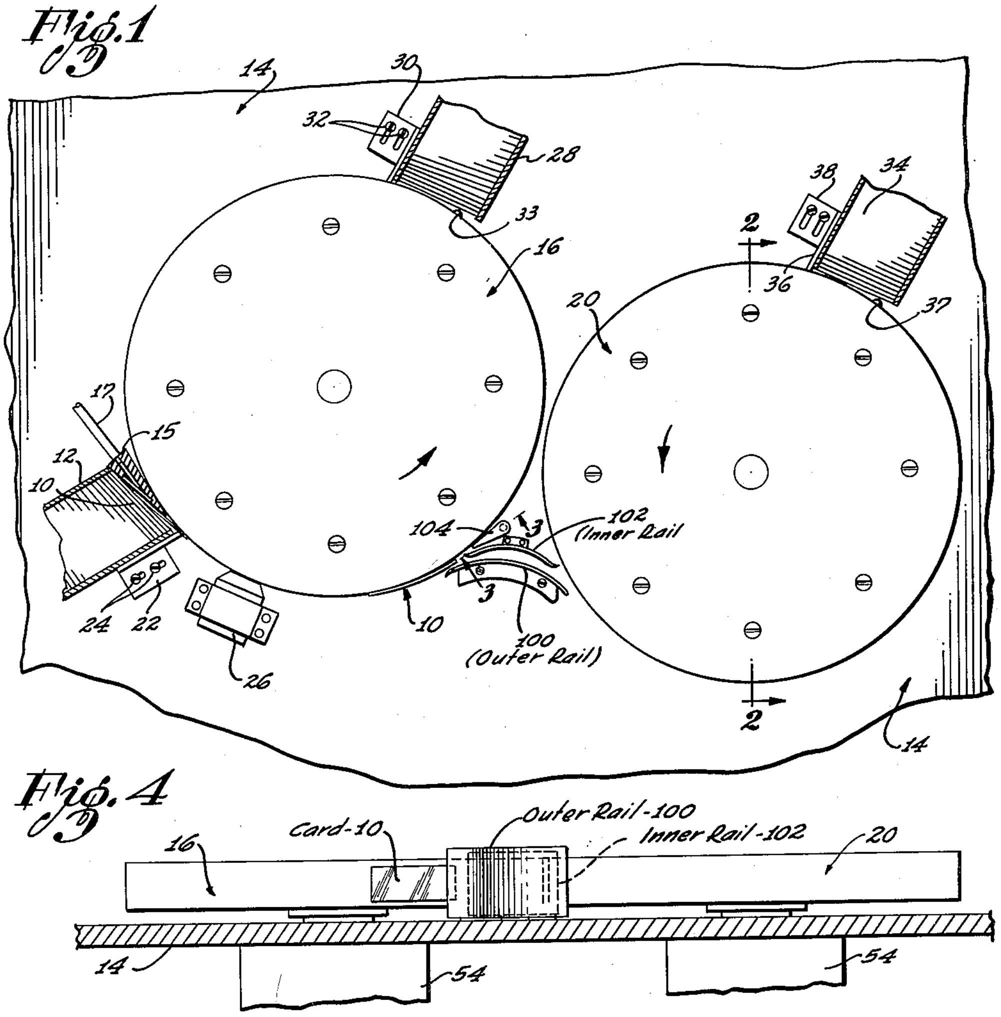
Figure 1 is a top plan view schematically illustrating a simple data processing system utilizing a pair of adjacent rotatable drums and incorporating a transfer mechanism constructed in accordance with one embodiment of the invention to effect a controllable transfer of information cards from one of the drums to the other.
Figure 4 is a side elevational view of the system of Figure 1 and particularly illustrates guides or rails used in the mechanism of the invention for guiding the cards from one drum to the other.

Referring to the drawings and more particularly to Figures 1 to 4, inclusive, it will be observed that the illustrated data processing system utilizes a plurality of information cards 10 which are disposed in a stack 12 (Figure 1). The bottom edge of each card in the stack rests on a flat surface such as a horizontal table top 14. The cards are supported in the stack 12 by the table top 14 in essentially vertical planes. The cards 10 are the information cards referred to previously. That is, each card is provided with a plurality of bits of information on one surface, these bits being represented, for example, by magnetic dots of one polarity or another. The bits of information may be disposed in a plurality of horizontal rows and corresponding bits of information in each row may be aligned into vertical columns.

A pair of drums 16 and 20 are mounted for rotation on the horizontal table top 14 about respective spaced parallel vertical axes. These drums are both adapted to be rotated in the same direction such as in a counterclockwise direction as shown in Figure 1. The stack 12 is mounted on the table top 14 with its mouth adjacent the peripheral surface of the drum 16. The relationship is such that the cards may be successively drawn from the mouth of the stack 12 by the drum 16 and circulated on the peripheral surface of the drum. A stop member 22 is mounted on the table top 14 adjacent the leading edge of the stack 10 with respect to the direction of rotation of the drum 16. This stop member is mounted on the table top by means of a pair of screws 24 which extend through slots in the stop member. This mounting arrangement enables the stop member to be adjustably positioned with respect to the periphery of the drum 16. The member 22 is adjusted so that it will allow only one card at a time to be drawn from the mouth of the stack 12 by the drum 16.

A retainer generally indicated at 15 is disposed at the rear end of the input stack 12 to contact the rear end of the leading end of the card in the input stack. The retainer is provided with a mouth portion which communicates with a conduit 17 extending through the retainer. Air is adapted to be withdrawn through the conduit 17 to produce a vacuum force on the trailing portion of the leading card in the stack 10. This vacuum force acts on the card to retain the card in the stack 12 in opposition to the vacuum force exerted on the card by the drum 16 to withdraw the card from the stack.

When the vacuum force in the retainer 15 becomes interrupted, the force exerted by the drum 16 becomes predominant. This causes the leading card in the stack 12 to become transferred to the periphery of the drum 16. In this way, by interrupting the vacuum force in the retainer 15 either periodically or at a variable rate, an intermittent feed of cards to the drum is obtained. The cards can also be transferred to the drum 16 in a continuous and steady stream by completely cutting off the vacuum in the retainer 15. The construction and operation of the retainer 15 and its associated control members are described in detail in copending application Serial No. 552,506 filed by Hans M. Stern on December 12, 1955, now Patent No. 2,927,791. This co-pending application has been assigned of record to the same assignee as this application.

A plurality of transducing heads may be disposed in contiguous relationship to the drum 16 to provide a coupling with the bits of information in each card as the card is transported by the drum. For purposes of convenience, a single transducing member 26 is positioned adjacent the drum 16. The head 26 serves to read certain identifying information on the cards as they are successively drawn from the mouth of the stack 12 by the drum and transported past this head. The head 26 may also be used to write information as the cards move with the drum past the head. This transducing head actuates a suitable control system which determines the particular cards which are to be transferred to the drum 20 and which are to be circulated around the drum 16 to be deposited, for example, in an output stack 28. Although no transducing heads corresponding to the head 26 are shown as being disposed in contiguous relationship to the drum 20, it should be appreciated that one or a plurality of transducer heads can be provided in association with the drum.

The output stack 28 is positioned with its mouth adjacent the drum 16. The output stack 28 is displaced around the drum from the input stack 12 and from the transducing head 26 by a predetermined distance in the direction of rotation of the drum. The output stack 28 has a stop member 30 mounted adjacent its trailing edge with respect to the direction of rotation of the drum 16. This latter stop member is mounted on the table top 14 by means of a pair of set screws 32 extending through slots in the stop member. The stop member 30 is positioned against the periphery of the drum 16 so that the cards cannot pass the output stack but are stripped from the drum and deposited in that stack. Pawls 33 may be disposed in contiguous relationship to the drum 20 between the leading and trailing walls of the stack 28 to insure that the cards become deposited in the stack in the same order as their movement with the drum 16 to the stack.

The vacuum transporting drum 20 also has an output stack 34 positioned adjacent its periphery. The output stack 34, like the output stack 28, has a stop member 36 mounted adjacent its trailing edge with respect to the direction of rotation of the drum 20. The stop member 36 is secured to the table top 14 by means of a pair of set screws 38. Pawls 37 corresponding to the pawls 33 are disposed in contiguous relationship to the drum 20 between the leading and trailing walls of the stack 34. The stop member 36 and the pawls 37 are positioned to strip cards from the periphery of the drum 20 and cause them to be deposited in the stack 34 in the same order as the movement of the cards with the periphery of the drum 20.

It should be noted that for purposes of simplicity the various stacks and transfer arrangements have the relationships described above. That is, the input stack 12 is described as sequentially making available the cards in the stack to the drum 16, which cards are deposited in the output stack 28 or in the output stack 34 by fixed stop members 30 and 36. These latter stop members are positioned so that a card cannot pass between them and the periphery of their associated drums and so that all cards transported to the output stacks are deposited in the stacks. Stacks and transfer means of this general type are disclosed, for example in copending application Serial No. 538,111 filed October 3, 1955, now Patent No. 2,842,362, by Robert M. Hayes and Alfred M. Nelson. This co-pending application has been assigned of record to the same assignee as this application.

Of course, other controllable transfer mechanisms are known for feeding cards from an input stack to a transporting drum and for removing cards from the transporting drums and feeding them to output stacks. Such controllable transfer mechanisms are described and claimed, for example, said Patent No. 2,927,791 to Hans M. Stern, said Patent No. 2,842,362, to Robert M. Hayes and Alfred M. Nelson, and copending application Serial No. 571,088, filed March 12, 1956, by Minoru T. Endo. All of these co-pending applications have been assigned of record to the same assignee as this patent application.

In the system of Figure 1, all the cards fed from the input stack 12 may be processed by the transducing head 26. Until a desired card is read by the head 26, the cards are circulated around the drum 16 to the output stack 28. However, when a desired card is read by the transducing head 26, this member causes the control system described previously to actuate the gate mechanism and system of the invention such that the card becomes transferred to the drum 20. The latter card is, therefore, in the output stack 34.

Figure 2:
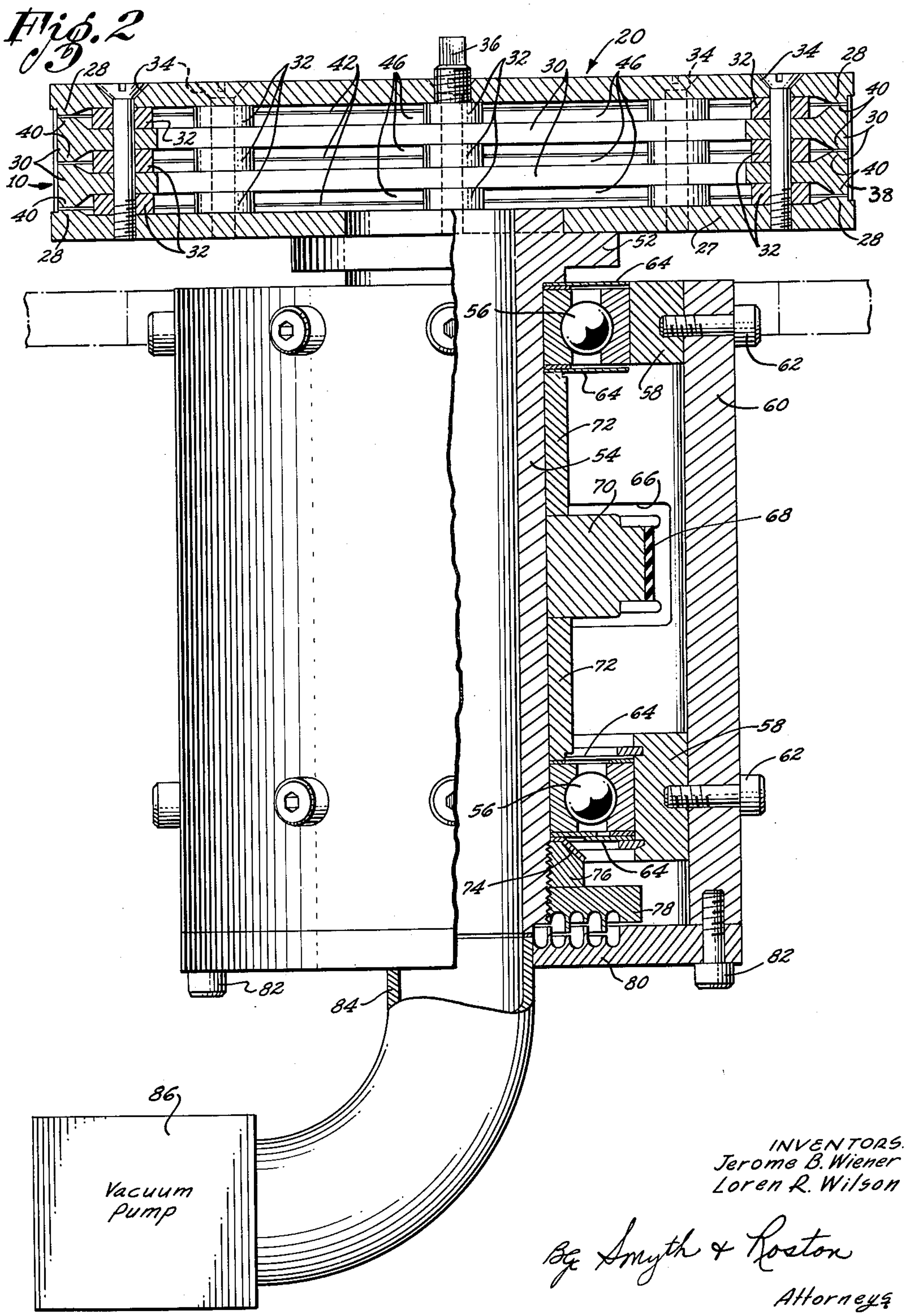
Figure 2 is a sectional view substantially on the line 2—2 of Figure 1 and illustrates the details of a typical rotatable transporting drum with which the transfer mechanism of the invention may be used, the view of Figure 2 being of an enlarged scale with respect to Figure 1.

Both the drums 16 and 20 are constructed to exhibit a vacuum pressure at their respective peripheral edges. As previously noted, this vacuum pressure serves to retain the cards firmly on the drums. Since the drums may be similar in their construction, only the details of the drum 20 are shown in Figure 2. It is believed sufficient for a clear understanding of the invention that only one of the drums be described in detail. It will also be appreciated that the drums can be constructed in a different manner than that described below. For example, drums similar to that described in copending application Serial No. 600,975 filed July 30, 1956, now Patent No. 2,883,189, by Loren R. Wilson, can also be used. This copending application has been assigned of record to the same assignee as this application.

The drum 20 includes a pair of spaced, parallel, external disc-like plates 27 mounted in coaxial relation. A pair of internal disc-like plates 30 is disposed between the plates 27 and in coaxial relation with the plates 27. The plates 30 are held in mutually spaced parallel relation and in spaced relation with the internal plates 27 by a plurality of groups of spacers 32. These spacers are held in place by a corresponding plurality of studs 34. The studs extend through the plates 27 and 30 at respective positions adjacent the peripheral edges of the plates. The studs also serve to retain the drum in a rigid assembled condition. A plug 36 extends into a threaded aperture at the center of the top plate 27.

The radius of each of the inner plates 30 is made slightly less than the radius of each of the outer plates 27. This difference in radius is made substantially equal to the thickness of the cards 10, and it serves to form a peripheral channel 38 around the drum for the cards. The rim of each of the inner plates 30 has an increased thickness with respect to the remaining portions of these plates. These rims are indicated as 40, and they cooperate with respective ones of a pair of rims 28 of the outer plates 27 to define a series of slots 42 extending around the periphery of the drum in the peripheral channel 38. The slots 42 communicate with suction passageways 46 which are formed between the plates 27 and 30.

The rotatable drum is supported on an annular collar 52. This collar is integrally formed at one end of a rotatable vertical hollow drive shaft 54. Suitable bearings 56 are mounted at spaced axial positions on the hollow shaft 54 adjacent the opposite ends of the shaft. These bearings serve rotatably to mount the shaft in a stationary housing 60 and they are retained within the housing by suitable bushings 58. The bushings 58 are secured to the housing by a series of studs 62. The bearings may be sealed by appropriate oil seals 64.

An opening 66 is formed in the housing 60 at a position corresponding to an intermediate position of the shaft 54. This opening enables a belt drive 68 to extend into the housing and around a pulley 70. The pulley 70 is rigidly mounted on the hollow shaft 54 in coaxial relation with the shaft. A pair of cylindrical sleeves 72 are mounted coaxially with the shaft 54 on opposite sides of the pulley 70 and serve as axial spacers for the bearings 56. In this manner, the shaft 54 and the drum assembly can be rotated by a suitable motor (not shown).

The bearings 56 and the pulley 70 are mounted in assembled condition on the shaft 54 by means of a nut 76 threaded to the lower end of the shaft and having an associated lock washer 74. A sealing disc 78 is also threaded to the lower portion of the shaft 54. This sealing disc cooperates with a bottom plate 80 of the housing 60 to form an air seal for the assembly. The plate 80 is secured to the housing 60 by a series of studs 82. The plate 80 has a central aperture therein which is axially aligned with the interior of the hollow shaft 54. A hollow conduit 84 is mounted in friction fit in the aperture of the plate 80. This conduit 84 extends to any suitable type of vacuum pump as indicated by the block 86. The vacuum pump draws air into the slots 42 and through the passageways 46 down the hollow shaft 54 and through the conduit 84. A vacuum pressure is established at the peripheral channel 38, therefore, and this vacuum pressure serves to retain the cards firmly on the peripheral surface of the drum.

The gate transfer mechanism of the invention includes a pair of spaced, arcuate, parallel guide rails 100 and 102 (Figures 1 and 4). The guide rails 100 will be designated as the outer rail and the guide rail 102 will be designated as the inner rail. These rails are disposed in essentially tangential relation to the drums and are provided with a generally arcuate configuration, as best seen in Figure 1.

The inner rail 102 extends between the two drums 16 and 20 and has its ends disposed adjacent the respective peripheral surfaces of the drums. The end of the inner rail 102 adjacent the drum 16 is spaced from the periphery of that drum a distance sufficient to allow a card to be circulated by the drum past the inner rail. The outer rail 100 is somewhat longer than the inner rail so that its ends project beyond the ends of the inner rail.

A lifter 104 is disposed between the inner rail 102 and the periphery of the drum 16. This lifter is positioned in generally tangential relationship with the periphery of the drum 16 but spaced from the periphery a distance sufficient to allow the cards on the drum 16 to be circulated between it and the drum. Although one type of lifter is shown in detail in Figures 1 and 3, it should be appreciated that other types of lifters can also be used. As illustrated in Figure 1, the lifter has a shape corresponding substantially to a tear drop in a horizontal plane and is symmetrical about its central axis. This central axis, as previously noted, is essentially tangential to the periphery of the drum 16.

Figure 3:
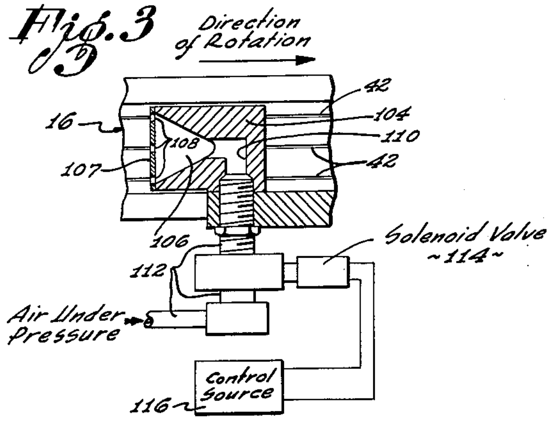
Figure 3 is a sectional view substantially on the line 3—3 of Figure 1 showing on a somewhat enlarged scale with respect to Figure 1 the details of a pneumatic lifter used in the transfer mechanism illustrated in Figure 1.

The lifter has a tapered configuration such that its narrow end or mouth is near the periphery of the drum 16. It has a hollow interior of essentially parabolic shape which defines its mouth portion 106 (Figure 3). A plate 107 is mounted across the mouth portion of the lifter and is provided with a plurality of apertures 108 which extend through the plate and which are respectively aligned with the slots 42 in the peripheral channel of the drum 16.

The lifter 104 is so positioned that air or other fluid under pressure passes through the mouth portion and out through the apertures 108 along the peripheral surface of the drum 16 between the drum and the end of the inner guide rail 102. A passageway 110 extends through the lifter and communicates with the mouth portion 106. A feed line 112 is coupled to the other end of the passageway 110 by any suitable coupling unit. The other end of the feed line 112 is adapted to receive air under pressure from any suitable air source not shown.

A suitable valve 114 is disposed in the air line 112 to control the flow of air through the line. This valve may be actuated by apparatus which includes a solenoid winding. A suitable control source 116 may be provided for controlling the times that the solenoid valve 114 becomes energized. The valve 114 is opened whenever the solenoid winding is electrically energized. When the winding is energized and the valve is opened, air under pressure passes to the lifter 104. This air flows through the passageway 110 and through the mouth 106 of the lifter. The air emerges from the apertures 108 as streams of air under pressure.

The streams of air emerging from the apertures 108 have a relatively high velocity because of the relatively small diameter of the apertures. These streams, therefore, impinge on the periphery of the drum 16 with relatively high force. This impingement of the streams is in a tangential direction between the inner rail 102 and the periphery of the drum 16. The air streams in effect exert a force between the periphery of the drum 16 and the leading edge of the particular card 10 which they contact so as to shear the card from the drum. The air streams lift the leading edge of the particular card 10 out from the periphery of the drum 16 in opposition to the retaining vacuum pressure exerted on the card through the peripheral channel of the drum.

After being lifted from the periphery of the drum, the leading edge of the card 10 becomes disposed between the inner rail 102 and the outer rail 100. Subsequent rotation of the drum 16 forces the card along the path between the guide rails 100 and 102. The length of each of the guide rails 100 and 102 is somewhat shorter than that of the card such that the leading end of the card emerges from between the guide rails and comes under the influence of the drum 20 while the trailing edge of the card is still being pressed against the drum 16. In this way, a portion of each card transferred from the drum 16 to the drum 20 is always pressed against the periphery of at least one of the drums during the transfer operation. This is important in preventing the card from slipping or from becoming lost during its transfer between the drums.

Therefore, as long as the solenoid valve 114 is not energized, the cards are circulated on the drum 16 past the guide rails 100 and 102 and past the lifter 104 to the output stack 28. However, under the control of the transducing head 26 (or any other suitable control), a circulating card may cause the source 116 to energize and open the solenoid valve 114. Such a control causes that card to be selected by the guide rails 100 and 102 and transferred to the drum 20 in the described manner so as to be deposited in the output stack 34.

It will be noted that both the drums 16 and 20 rotate in the same direction such as in a counterclockwise direction in Figure 1. This is desirable in simplifying the construction of the motor and members such as gears associated with the motor for driving the drums 16 and 20. It will also be noted that as a card is transferred from the drum 16 to the drum 20 by the transfer mechanism of the invention, it engages the drum 20 by the same contacting face with which it previously engaged the drum 16. In this way, the face of each card 10 not contacted by the drums can retain the information without any loss in intensity which may occur by rubbing the face against the periphery of one of the drums. This may be especially true when the information on the cards is in magnetic or photographic form. Furthermore, since the cards move on the drum 20 in the same orientation of faces as on the drum 16, they can be deposited in the stack 34 without any necessity for their faces to be inverted.

As described in the previous paragraph, the information on the face of the card can never be rubbed off in the embodiment shown in Figure 1 since the face never contacts the drums 16 and 20. This rubbing action against the face of a card may sometimes occur with great intensity when the card is being retained in an input stack such as the stack 12 and part of the card is pressed against a drum such as the drum 16 for subsequent removal by the drum. The rubbing action may also sometimes occur with great intensity when a card is being transferred from a drum such as the drum 16 to an output stack such as the stack 28. The reason is that the relative speed between the drum and the card at such times is relatively high. Because of this rubbing action, it is occasionally possible to remove information from the face of a card when the face is being engaged by a drum.

Figure 5:
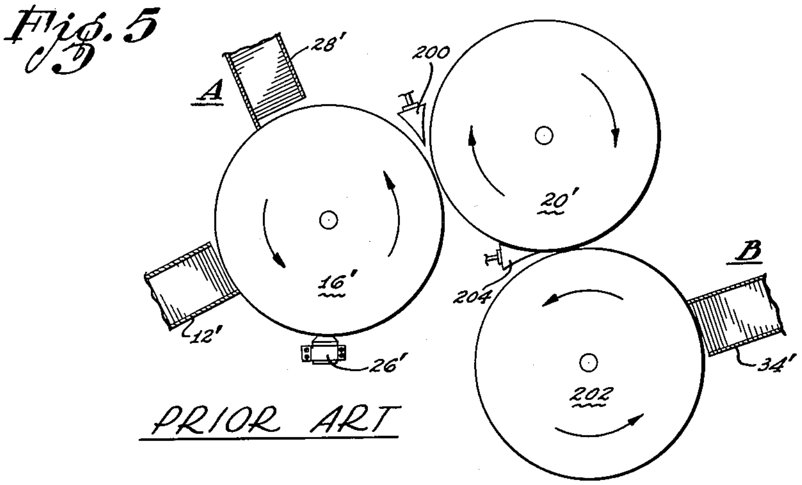
Figure 5 shows a prior art system which performs somewhat similar functions to the system shown in Figure 1 but which requires additional components without obtaining all of the advantages of the system shown in Figure 1.

Figure 5 shows a prior art arrangement for accomplishing the same result as the system of Figure 1. The prior art embodiment includes a pair of oppositely rotatable vacuum transporting drums 16' and 20'. For example, the drum 16' may be rotating in a counterclockwise direction and the drum 20' may be rotating in a clockwise direction as shown in Figure 5. This embodiment also includes an input stack 12' mounted adjacent the drum 16' and an output stack 28' disposed adjacent that drum. It will be understood that the representation of Figure 5 is schematic and also that the drums 16' and 20' may have generally the same structural configuration as the drums 16 and 20 of Figure 1. Also, it will be understood that the stacks 12' and 28' may be similar in their construction to the stacks 12 and 28 of Figure 1.

A transducing head 26' is disposed adjacent the drum 16' and displaced around the drum a short distance from the stack 12' in the direction of drum rotation. This head controls a mechanical gate 200 to pivot that gate into engagement with the drum 16' when a card read by the head 26' has the desired identification. This pivoting of the gate 200 causes the gate to strip the selected card from the periphery of the drum 16′ and to transfer the selected card to the periphery of the drum 20′. It will be noted that the drums 16′ and 20′ must rotate in opposite directions and that the contacting surface of the transferred card is reversed as it is transferred to the drum 20′.

It is usually required that the selected cards be stacked in the output stack in the same orientation as they were in the input stack. In the prior art, this requires an additional rotatable drum 202 to be disposed adjacent the drum 20′. An additional gate 204 is also required. The gate 204 may be positioned in permanent engagement with the peripheral surface of the drum 20′ so that all cards transported by the drum 20′ are transferred to the drum 202. The drum 202 rotates in the opposite direction to the drum 20′, and the cards transferred to the drum 202 have their contacting surface reversed so that they are restored to their original orientation. The output stack 34′ corresponding to the output stack 34 of Figure 1 is positioned adjacent the drum 202 to receive the cards transported on the peripheral surface of that drum. Therefore, as compared with the embodiment of Figure 1, the prior art system of Figure 5 requires an additional gate 204. It also requires an additional rotatable drum 202 to deposit the cards with unchanged orientation on the output stack 34′. The system also requires that both faces of each card be engaged at different times by the drums.

Figure 6:
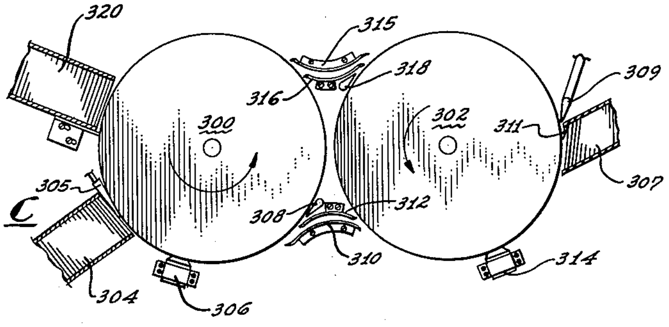
Figure 6 shows schematically a second data processing system using the described embodiment of the invention.

Figure 6 shows schematically a system utilizing a pair of gate mechanisms each constructed in accordance with the embodiment of the invention shown in Figures 1 to 4, inclusive. The system of Figure 6 is one in which certain cards may be selected and transferred to a second drum for processing and may be returned to the first drum after such processing. The system includes a pair of rotatable vacuum transporting drums 300 and 302 of the described type, both rotating in the same direction such as in a counterclockwise direction. An input stack 304 is disposed adjacent the drum 300.

A transducing head 306 is also positioned adjacent the drum 300. Although only one transducing head is shown in Figure 6, a plurality of heads may also be used. This transducing head actuates a control system to initiate the air streams through a lifter 308 for selected cards in the described manner. The lifter 308 is disposed at the entrance of a pair of guide rails 310 and 312. This lifter causes the selected cards to be transferred between the guide rails to the second drum 302. The selected cards are then rotated on the drum 302 past a transducing head 314 for processing.

Alternative operations may be performed for the card moving with the drum 302 past the transducer 314. As one alternative, the cards may continue their movement with the drum 302 past a stack 307. As another alternative, the cards may become deposited in the stack 307 upon the operation of a lifter 309 to remove the cards from the drum. When the lifter 309 becomes operated, the cards become peeled by a blast of air from the lifter and become deposited on a finger 311 which extends from the rear wall of the stack 307 toward the front wall of the stack. The finger 311 extends in an arcuate path toward the drum 302 as it extends toward the front wall of the stack 307. The finger 311 has a tapered configuration with progressive distances toward the front wall of the stack 307. The construction of the lifter 309 and the finger 311 are fully described in copending application Serial No. 596,222 filed July 6, 1956, by Jerome B. Wiener et al. This co-pending application has been assigned of record to the same assignee as this application.

A second pair of guide rails 315 and 316 are positioned between the drums 300 and 302. These guide rails 315 and 316 coact with the drums 300 and 302 at positions removed from the positions of co-action between the guide rails 310 and 312 and the drums. The guide rails 315 and 316 have associated with them a lifter 318 which may be similar to the lifter 104 of Figures 1 and 3. The lifter 318 is controlled to return the cards through the guide rails 315 and 316 from the drum 302 to the drum 300 so that they may be returned to an output stack 320 disposed adjacent the drum 300.

A controllable transfer mechanism such as described in copending application Serial No. 552,506 may be associated with the input stack 304. This transfer mechanism may be controlled to cause the cards to be fed to the drum 300 in such a manner that a new card is fed to the drum only after a card has been deposited in the output stack 320. This permits the cards to be stacked in the proper order in the output stack whether they are circulated directly on the drum 300 to the output stack 320 or whether they are transferred to the drum 302 for processing in the described manner.

The transfer of cards from the stack 304 to the drum 300 may be controlled by a retainer 305 which has a construction and operation similar to the retainer 15 in Figure 1. The cards become interrupted when the vacuum force produced on the leading card in the stack 304 becomes interrupted. In this way, an intermittent-release system is produced. The cards may be released at a constant frequency or at a variable rate. Furthermore, by continually interrupting the vacuum force produced by the retainer 305, the cards can be transferred from the stack on a continuous basis.

Figure 7:
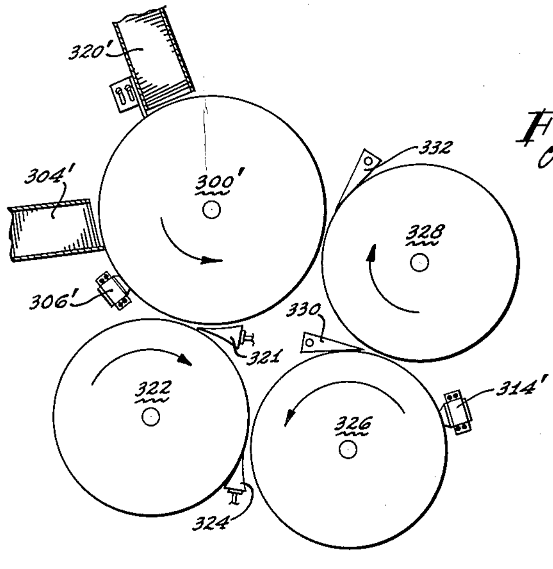
Figure 7 is a schematic representation of an equivalent prior art system which accomplishes the result of Figure 6 but which requires extraneous components including two additional drums without attaining all of the advantages of the system shown in Figure 6.

The prior art system of Figure 7 accomplishes the result of the system of Figure 6 but requires two additional rotatable drums and a pair of additional gates. In the system shown schematically in Figure 7, an input stack 304′ feeds cards either controllably or successively to a rotatable drum 300′. These cards are transported past a transducing head 306′. The cards circulate around the drum 300′ to an output stack 320′ until a selected card is read by the head 306′. The head then causes a suitable control system to pivot a gate 321 into engagement with the drum 300′ so as to transfer the selected card to a drum 322. The drum 322 is rotating in the opposite direction to the drum 300′. For example, the drum 322 is rotating in a clockwise direction when the drum 300′ is rotating in a counterclockwise direction.

As before, the contacting surface of the card is reversed during its transfer from the drum 300′ to the drum 322. Therefore, the pertinent data is on the contacting surface so that the card cannot immediately be processed. This causes a second gate 324 to be required. The gate 324 is permanently positioned adjacent the periphery of the drum 322 to transfer cards from the periphery of the drum 322 to a drum 326. Since the drum 326 rotates in the opposite direction to the drum 322, the card is again reversed in the transfer to the drum 326 so that it can present its recorded data to a transducing member 314′ positioned adjacent the periphery of the drum 326.

After processing by the transducing member 314′, the card cannot be immediately transferred back to the drum 300′ because of the reversal of its contacting surface in such prior art transfers. This causes an additional drum 328 to be required. A gate 330 is permanently positioned against the peripheral surface of the drum 326 to transfer the card to the drum 328. An additional gate 332 is permanently positioned against the periphery of the drum 328 to return the card with proper orientation to the original transporting drum 300′ for stacking in the output stack 320′.

It will be seen that the system of Figure 6 using the gating mechanism of the invention accomplishes the same purpose as the system of Figure 7 but in a simpler manner and with the requirement of fewer components. The system shown in Figure 6 requires two less drums and two less gates than the system shown in Figure 7 to perform the same functions as the system shown in Figure 7. In this respect, the advantages of the system shown in Figure 6 over the system shown in Figure 7 are even greater than the advantages of the system shown in Figure 1 over the system shown in Figure 5. This results from the fact that the system shown in Figure 1 requires only one less drum and one less gate than the system shown in Figure 5.

Like the system shown in Figure 1, the system shown in Figure 6 is also advantageous in that all of the drums in the system rotate in the same direction. The system shown in Figure 6 is also advantageous in that each card is transported by the successive drums in the system on the same face of the card. In this way, the information on the other face can be retained without any possibility of a loss in intensity.

The invention provides, therefore, an improved gating apparatus and mechanism which enables cards to be transferred from a first drum to a second drum rotating in the same direction as the first drum. The transfer is effected without reversing the contacting surface of the transferred card. This prevents wear of the recorded data and provides a simplification of the transporting apparatus, as described above.

It should be appreciated that other types of apparatus can be used instead of the drum 20 to receive the cards from the drum 16. For example, such types of receiving apparatus can even include an output station.

Although this application has been disclosed and illustrated with reference to particular applications, the principles involved are susceptible to numerous other applications which will be apparent to persons skilled in the art. The invention is, therefore, to be limited only as indicated by the scope of the appended claims.

What is claimed is:

1. In a system for processing data on a plurality of information storage cards, the combination of first and second transport members disposed in contiguous relationship to each other and constructed to provide a movement of the cards, guide means disposed between the transport means and shaped at opposite ends in substantially tangential relationship with the transport means to provide a transfer of cards from a first one of the transport means to the other, transducing means disposed in coupled relationship to the first transport means at a position before the guide means in the direction of movement of the cards for processing data on the transported cards on the first transport means, and lifter means operative on the cards at a position near the guide means for directing a fluid stream under pressure against the cards on the first transport means in accordance with the data processed on the cards to lift the cards from the first transport means to the guide means for transfer to the second transport means.

2. In a system for processing data on a plurality of information storage cards, the combination of first and second movable transport members constructed to provide a movement of the cards in accordance with the movements of the transport members, stationary guide means extending between the first and second transport members in essentially tangential relationship to the adjacent transport members at their opposite ends and constructed to direct the cards for movement from the first transport member to the second transport member without changing the contacting face of each such card with respect to the first and second transport members, transducing means disposed in coupled relationship to the cards being transported by the first transport member to process particular information on the cards, and lifter means disposed in spaced relationship to the transducing means and operative in accordance with the data processed by the transducing means on each card being transported by the first transport member for subjecting cards on the first transport member to an opposing air stream in a particular direction relative to the transport member and at the position of transfer of the cards to the guide means to direct the cards to the guide means for transfer to the second transport member.

3. The system set forth in claim 2 in which the guide means are provided with first and second members spaced from each other to provide a movement of the cards between the members from the first transport member to the second transport member and in which each of the first and second guide members is provided with an arcuate shape.

4. In a system for processing data on a plurality of information storage cards, the combination of: first and second vacuum-pressure rotatable drums constructed to support each of the cards in the plurality on the peripheral surfaces of the drums and to obtain a movement of the cards with the drums, guide means disposed between the drums to receive cards in the plurality from the first drum and constructed to obtain a movement of the cards along the guide means and disposed relative to the second drum to obtain a transfer of the cards from the guide means to the second drum without changing the contacting face of each of the cards with respect to the disposition of the cards on the first drum, transducing means disposed in coupled relationship to the cards in the plurality on the first drum for processing particular information on the cards moving with the first drum past the transducing means, and means responsive to the particular information processed on the cards in the plurality of the transducing means for obtaining a transfer of first particular cards in the plurality to the guide means in accordance with the information processed on the cards in the plurality and for obtaining a movement of second particular cards in the plurality with the first drum past the position of transfer of the cards to the guide means and in accordance with the information processed on the cards in the plurality.

5. In a system for processing data on a plurality of information storage cards, the combination of: first and second transport means for the cards in the plurality, guide means disposed between the first and second transport means and constructed to obtain a transfer of cards in the plurality from the first transport means to the second transport means without changing the contacting face of each of the cards with respect to the first and second transport means, the guide means being spaced from the first and second transport means and being disposed relative to the second transport means to obtain a transfer of cards from the guide means to the second transport means, and transfer means disposed in coupled relationship to the cards on the first transport means at the position of transfer of the cards from the first transport means to the guide means and disposed in spaced relationship to the transducing means for selectively directing the cards on the first transport means to the guide means for a transfer of such cards from the guide means to the second transport means.

6. In a system for processing data on a plurality of information storage cards, the combination of: transport means for the cards, means for receiving the cards, guide means disposed between the transport means and the receiving means and in spaced relationship to the transport means and to the receiving means and constructed to obtain a movement of the cards along the guide means and disposed relative to the receiving means to obtain a transfer of the cards from the guide means to the receiving means without changing the contacting face of each such card with respect to the transport means and the receiving means, means operatively coupled to the cards on the transport means for directing the cards on the transport means to the guide means to cause such cards to be transferred to the receiving means, and transducing means responsive to particular information on the cards on the transport means and operative upon the transfer means in accordance with the processed information to obtain a selective transfer of first particular cards in the plurality from the transport means to the guide means and a transport of second particular cards in the plurality past the position of transfer of such cards to the guide means.

7. In a system for processing data on a plurality of information storage cards, the combination of: means including a rotatable member constructed to obtain a movement of the cards in the plurality with the rotatable member on the peripheral surface of the rotatable member, receiving means for the cards, guide means disposed between the rotatable member and the receiving means and constructed to obtain a movement of the cards in the plurality along the guide means and disposed relative to the receiving means for obtaining a transfer of the cards in the plurality from the guide means to the receiving means without changing the contacting face of each of the cards with respect to the rotatable member and the receiving means, controllable means operatively coupled to the cards on the peripheral surface of the rotatable member for selectively directing the cards on the peripheral surface of the rotatable member to said guide means, and transducing means disposed in coupled relationship to the cards on the rotatable member at a position before the controllable means in the direction of movement of the cards on the rotatable member and responsive to particular data on the cards to obtain a movement of first particular cards with the rotatable member past the guide means and a transfer of second particular cards from the rotatable member to the guide means in accordance with the particular information processed on the cards.

8. In a system for processing data on a plurality of information storage cards, the combination of: first and second transport means movable in closed loops and constructed to obtain a movement of the cards in the plurality with the transport means, guide means constructed to obtain a movement of the cards in the plurality along the guide means and disposed relative to the second transport means to obtain a transfer of the cards from the guide means to the transport means, and transfer means operatively coupled to the cards on the first transport means for subjecting such cards to a fluid stream under pressure to direct the cards from the first transport means to the guide means for movement of the cards to the second transport means.

9. The combination set forth in claim 8 in which transducing means are operatively coupled to the cards on the first transport means at a position before the transfer means in the direction of movement of the cards to process particular information on the cards and in which the transducing means are operatively coupled to the transfer means to obtain a transfer of first particular cards in the plurality from the first transport means to the guide means and to obtain a transport of second particular cards in the plurality past the position of transfer to the guide means in accordance with the particular information processed on the cards.

10. In a system for processing data on a plurality of information storage cards, the combination of: means including an input stack constructed to hold the cards in the plurality in stacked relationship, first and second transport means for the cards, means disposed in coupled relationship to the cards in the input stack for obtaining a controlled transfer of such cards from the input stack to the first transport means, guide means constructed to obtain a movement of the cards in the plurality along the guide means and disposed in coupled relationship to the second transport means to obtain a transfer of the cards from the guide means to the second transport means after the movement of the cards along the guide means, the guide means being constructed to obtain a transfer of the cards from the first transport means to the second transport means with the same face of each of the cards engaging the first and second transport means, and transfer means operatively coupled to the cards on the first transport means for subjecting such cards to a fluid stream under pressure to direct the cards to the guide means for transfer to the second transport means.

11. The combination set forth in claim 10, including, transducing means operatively coupled to the cards on the first transport means at a position between the input stack and the transfer means to process particular information on the cards on the first transport means and operatively coupled to the transfer means to obtain a transfer of only selected cards from the first transport means to the guide means in accordance with the particular information processed on the cards.

12. In a system for processing data on a plurality of information storage cards, the combination of: first and second means rotatable in the same direction and constructed to obtain a transport of the cards in the plurality on the peripheral surfaces of such rotatable means in accordance with the rotary movement of such rotatable means, guide means constructed to obtain a movement of the cards along the guide means and disposed between the first and second rotatable means for obtaining a transfer of cards in the plurality from the first rotatable means to the second rotatable means with the same face of each of the cards engaging the peripheral surfaces of the rotatable means, and means operatively coupled to cards in the plurality on the peripheral surface of the first rotatable means for subjecting such cards to an air stream in a particular direction relative to the peripheral surface of the first rotatable means and at the position of transfer to the guide means to direct such cards to the guide means for transfer to the second rotatable means.

13. In a system for processing data on a plurality of information storage cards, the combination of: first and second rotatable means disposed adjacent to each other and movable in closed loops in the same rotary direction and constructed to obtain a movement of the cards in the plurality on the peripheral surfaces of such rotatable means in accordance with the movements of such rotatable means, a pair of arcuate guide rails disposed in spaced relationship to each other and disposed in contiguous relationship to the first and second rotatable means and in tangential relationship with respect to the peripheral surfaces of the rotatable means for obtaining a movement of the cards in the plurality from the first rotatable means along the guide rails to the second rotatable means for the transfer of such cards to the second rotatable means with the same face on each of the cards engaging the peripheral surfaces of the first and second rotatable means, and transfer means operatively coupled to the cards on the first rotatable means at the position of transfer of the cards by the guide means from the first rotatable means to the second rotatable means for subjecting the cards in the plurality on the peripheral surface of the first rotatable means to a pneumatic force at a position contiguous to the guide rails to obtain a transfer of the cards to the space between the guide rails for movement of the cards along the guide rails to the second rotatable means.

14. The combination defined in claim 13 in which one of the guide rails is longer than the other guide rail to maintain both guide rails in contiguous relationship to the first rotatable means and in which transducing means are disposed in coupled relationship to the cards on the first movable means at a position before the transfer means in the direction of movement of the cards to process particular information on the cards, the transducing means being operatively coupled to the transfer means to obtain a transfer of first particular cards in the plurality from the first movable means to the guide means in accordance with the particular information processed on the cards and to obtain a movement of the other cards in the plurality with the first movable means past the position of transfer to the guide means.

15. In a system for processing data on a plurality of information storage cards, the combination of: an input stack constructed to hold the cards in stacked relationship, transport means for the cards, first transfer means disposed in coupled relationship to the cards in the input stack for obtaining a controlled transfer of cards from the input stack to the transport means, guide means disposed at one end in coupled relationship to the cards on the transport means and constructed to obtain a movement from the transport means of cards transferred to the guide means from the transport means, second transfer means operatively coupled to the cards on the transport means and disposed in coupled relationship to the guide means for subjecting the cards on the transport means to a fluid stream under pressure to direct the cards from the transport means to the guide means, and means coupled to the guide means for receiving the cards transferred to the guide means from the transport means.

16. The combination set forth in claim 15 in which transducing means are operatively coupled to the cards on the transport means in a position between the input stack and the guide means and in which the transducing means are responsive to particular information on the transported cards and in which the transducing means are operatively coupled to the transfer means to obtain a transfer of first particular cards in the plurality to the guide means from the transport means in accordance with the particular information processed on the cards and to maintain second particular cards in the plurality on the transport means in accordance with such processed information and in which the guide means are constructed to have the same face of each card in the plurality engage the transport means and the receiving means.

17. In the system set forth in claim 5, second guide means disposed between the first and second transport means at a position displaced from the first guide means in the direction of transport of the cards on the second transport means and constructed to obtain a transfer of cards in the plurality from the second transport means to the first transport means without changing the contacting face of each of the cards with respect to the first and second transport means, the second guide means being spaced from the first and second transport means and being disposed relative to the first transport means to obtain a transfer of cards from the second guide means to the first transport means, and second transfer means disposed in coupled relationship to the cards on the second transport means for directing the cards on the second transport means to the second guide means for a transfer of such cards from the second guide means to the first transport means.

18. In the system set forth in claim 8, second guide means constructed to obtain the movement of the cards in the plurality along the second guide means and disposed relative to the first transport means to obtain a transfer of the cards from the second guide means to the first transport means, and second transfer means operatively coupled to the cards on the second transport means for subjecting such cards to a fluid stream under pressure to direct the cards from the second transport means to the second guide means for movement of the cards to the first transport means.

19. The combination set forth in claim 9, including, second guide means constructed to obtain a movement of the cards in the plurality along the second guide means and disposed in coupled relationship to the first transport means to obtain a transfer of the cards from the second guide means to the first transport means after the movement of the cards along the second guide means, the second guide means being constructed to obtain a transfer of the cards from the second transport means to the first transport means with the same face of each of the cards engaging the first and second transport means, the second guide means being disposed at a position removed from the first guide means in the direction of the transport of the cards on the second transport means, second transfer means operatively coupled to the cards on the second transport means for subjecting such cards to a fluid stream under pressure to direct the cards to the second guide means for transfer to the first transport means, and means including an output stack constructed to hold the cards in the plurality in stacked relationship and operatively coupled to the cards on the first transport means after the transfer of the cards from the second transport means to the first transport means for obtaining a transfer of the cards from the first transport means to the output stack.

20. The combination set forth in claim 13, including, a second pair of arcuate guide rails disposed in spaced relationship to each other and disposed in contiguous relationship to the first and second rotatable means and in tangential relationship with respect to the peripheral surfaces of the rotatable means for obtaining a movement of the cards in the plurality from the second rotatable means along the second pair of guide rails to the first rotatable means for the transfer of such cards to the first rotatable means with the same face on each of the cards engaging the peripheral surfaces of the first and second rotatable means, the second pair of guide rails being displaced from the first pair of guide rails in the direction of movement of the second rotatable means, and second transfer means operatively coupled to the cards on the second rotatable means for subjecting the cards in the plurality on the peripheral surface of the second rotatable means to a pneumatic force at a position contiguous to the second pair of guide rails to obtain a transfer of the cards to the space between the second pair of guide rails for movement of the cards along the second pair of guide rails to the first rotatable means.

References Cited in the file of this patent

UNITED STATES PATENTS

| | | |
|---|---|---|
| 1,595,478 | Minton | Aug. 10, 1926 |
| 1,838,200 | Tomtlund | Dec. 29, 1931 |
| 2,065,178 | Federwitz et al. | Dec. 22, 1936 |
| 2,620,924 | Kusters | Dec. 9, 1952 |
| 2,795,378 | Tyler et al. | June 11, 1957 |
| 2,842,362 | Hayes | July 8, 1958 |